Dec. 26, 1939.  C. W. SAVITZ  2,184,689
PRESSURE RECORDER
Filed May 17, 1937  2 Sheets-Sheet 1
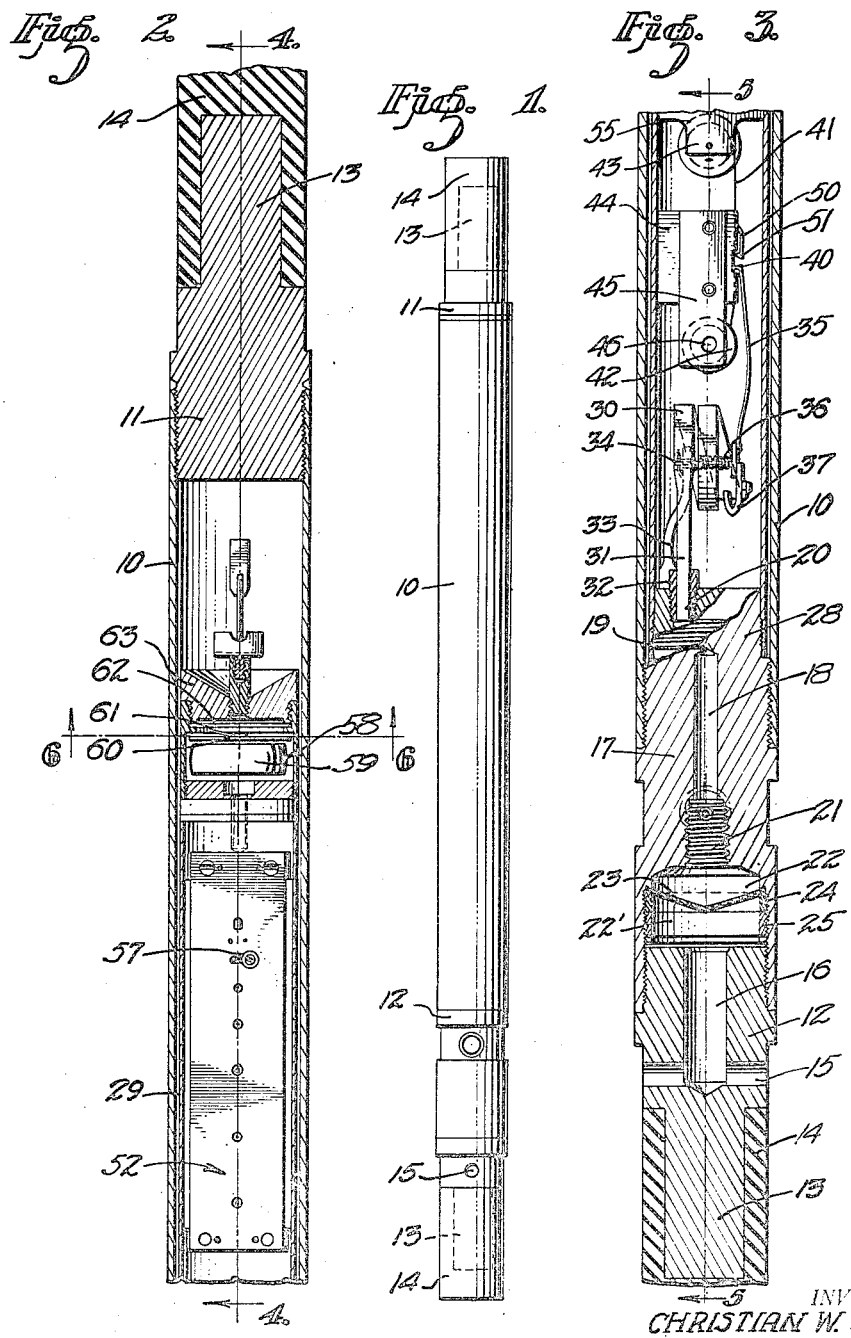
INVENTOR.
CHRISTIAN W. SAVITZ
BY James M. Abbett
ATTORNEYS.

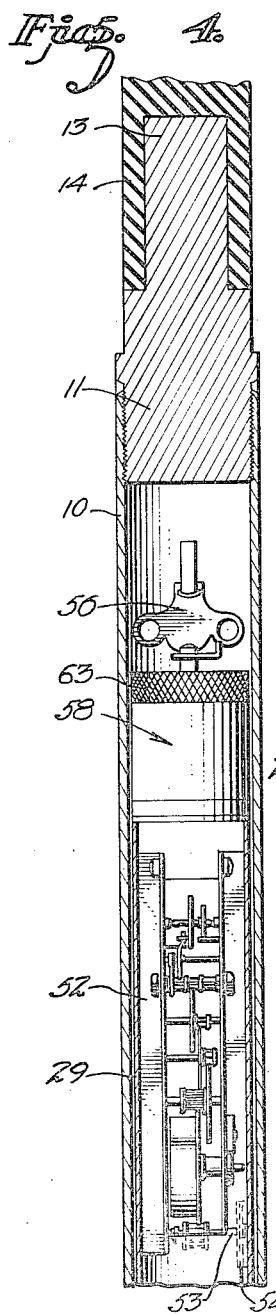
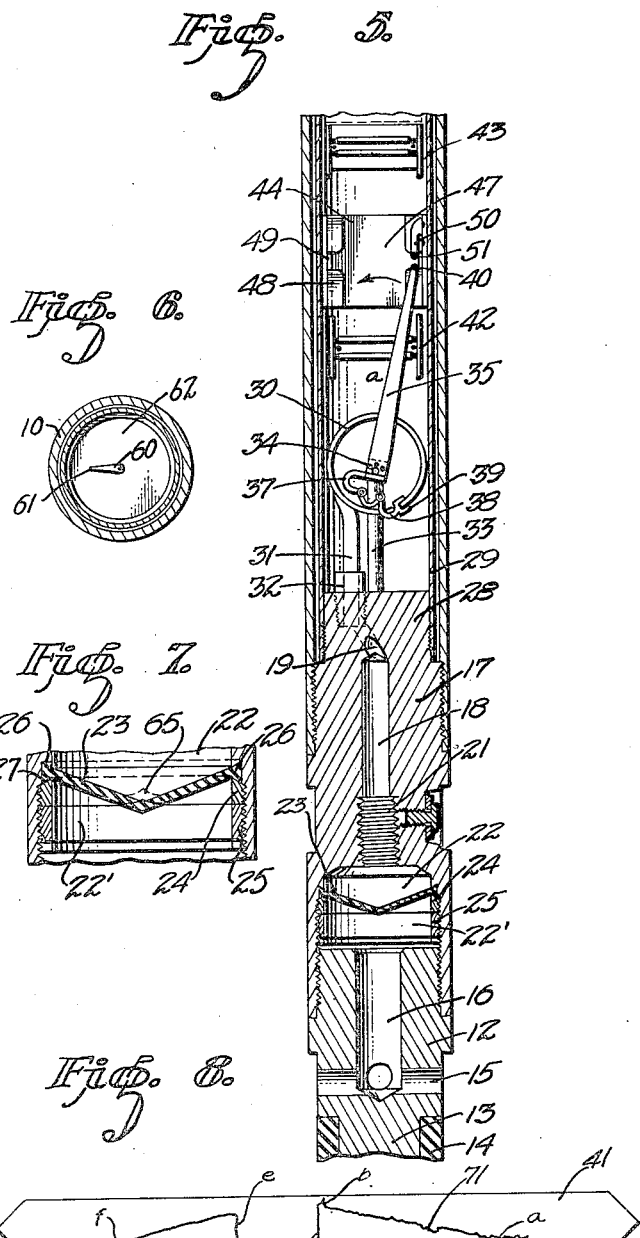

Patented Dec. 26, 1939

2,184,689

UNITED STATES PATENT OFFICE 2,184,689

PRESSURE RECORDER

Christian W. Savitz, Los Angeles, Calif.

Application May 17, 1937, Serial No. 143,130

4 Claims. (Cl. 234—20)

This invention relates to well testing and surveying apparatus, and particularly pertains to a pressure recorder.

In drilling oil wells and placing them on production it has now become common practice to measure the magnitude of fluid pressure prevalent in the well at a selected depth, and various types of fluid pressure measuring devices have been designed for use in testing wells which are on production. In such an instance the fluid pressure testing device includes a recording element usually operated in connection with some type of motive power by which a graph may be prepared as the measuring instrument is submerged in the fluid of the well. It will be evident that when the well contains a column of fluid into which the measuring instrument is progressively lowered it is necessary that there will not be any violent force produced which would tend to throw excessive shock upon the instrument damaging its parts and causing any inaccurate reading to be made. This type of measuring device is, however, now being used in connection with formation and casing shoe tests. In those tests the testing tool and the pressure measuring device are lowered together into the well and are connected to an empty string of pipe carrying a packer. During the lowering operation the action upon the pressure measuring device would be gradual as in the case of testing a well on production. When, however, such a device is used in connection with a formation or casing shoe tester the head of liquid within the well is packed off above the pressure measuring device, and under such conditions a valve is opened permitting sudden entry of the fluid from the well bore below the packer into the empty string of drill pipe, and since the empty string of drill pipe is usually under atmospheric pressure a violent change in the pressure of the fluid within which the pressure measuring device is submerged will occur. This imposes extreme shock and strain upon the parts of the pressure measuring and recording device so that a device of ordinary design is liable to be damaged, its parts permanently distorted and an inaccurate measurement and record obtained. It is the principal object of the present invention therefore to provide a fluid pressure recording device operating under the usual or under the most extreme conditions, and which device may be subjected to violent change in fluid pressure without harm to its working parts and without danger that the pressure responsive members will be ruptured or distorted, or the recorded graph be inaccurate.

The present invention contemplates the provision of a fluid pressure recording device which is of rugged construction and simple design so that it may meet all of the requirements of oil well practice, the structure embodying the use of a Bourdon tube responsive to fluid pressure, and actuating a stylus by which a graph may be marked upon a relatively long traveling ribbon which insures that a graph line will be made particularly adapted for accurate calibration.

The invention is illustrated by way of example in the accompanying drawings in which:

Figure 1 is a view in elevation showing the pressure recording device and the shock absorbing elements applied to its opposite ends.

Fig. 2 is an enlarged fragmentary view in central section and elevation showing the upper portion of the recording device and the position of a timing clock therein.

Fig. 3 is a fragmentary view in central longitudinal section and elevation showing the lower portion of the recorder and its fluid responsive means.

Fig. 4 is a view in central longitudinal section on line 4—4 of Fig. 2 showing the parts in section and elevation, but viewed at right angles to Fig. 2.

Fig. 5 is a view in central longitudinal section and elevation showing the lower portion of the recorder as shown in Fig. 3 but with the structure viewed at right angles to that of its showing in Fig. 3.

Fig. 6 is a view in transverse section as seen on the line 6—6 of Fig. 2.

Fig. 7 is an enlarged view in section indicating the manner in which the pressure diaphragm responds to fluid pressure and tends to insure that accurate straight line calibrations will be obtained in making measurements.

Fig. 8 is a view in elevation drawn at a reduced scale showing the recording ribbon and a typical graph inscribed thereon.

Referring more particularly to the drawings, 10 indicates a tubular housing in the opposite ends of which are plugs 11 and 12. These plugs are threaded at their inner ends into the tubular housing 10 and have reduced outer end portions 13 which receive cylindrical rubber buffers 14. This structure as shown in Fig. 1 is mounted within an armored casing having openings through which fluid under pressure may pass when the casing is submerged within a liquid. The lower plug 12 is formed with lateral openings 15 through which this fluid may pass to a central passageway 16 in the plug 12. The lower plug 12 is directly threaded into a body member 17 which in turn is threaded into the lower end of the tubular housing 10. A main central passageway 18 is formed partially through the body member 17, its upper end communicating with a duct 19 leading to an outlet connection 20. The lower end of the passageway 18 is formed with a threaded section 21, thus formed for a purpose to be hereinafter set forth. This threaded section communicates with a counterbore 22 forming a seat for a flexible diaphragm 23. Lock rings 24 and 25 are threaded into the end of the body member 17 which in turn engage the marginal edge of the diaphragm to hold it in position. Attention is particularly directed to the enlarged view of this diaphragm as shown in Fig. 7 where it will be seen that a V-shaped marginal bead 26 is formed around the lower circumferential edge of the diaphragm and is engaged by a tapered face 27 of lock ring 24 to hold the diaphragm in its seated position. It will also be seen that the diaphragm is in the shape of a flat cone, the apex of which is presented downwardly against the pressure of fluid exerted from on the outside of the instrument, and as will be hereinafter explained this arrangement has a particular bearing upon the character and reliability of the recording made.

Threaded on to a reduced upper portion 28 of the body member 17 is a tubular liner 29 within which the recording instrument and its clock are directly housed. This structure comprises a Bourdon tube 30 having a tubular shank 31 extending into the opening 20 of the body member 17 and there secured by a packing plug 32. Fastened to the body member 17 is a standard 33 carrying a pivot shaft 34 upon which a recording arm 35 is mounted for oscillation. A coil spring 36 circumscribes the pin 34 and exerts pressure between the standard 33 and the arm 35 tending to swing the arm 35 to its non-recording position and to resist the action of the Bourdon tube. An arm 37 is rigidly secured to the base of the recording arm 35 and is pivoted to a link 38 having a stirrup 39. This stirrup is engaged by the free end of the Bourdon tube and will move with it as it is affected by the pressure of the fluid within the tube. The arm 35 extends longitudinally within the structure and at its free end carries a stylus 40. The stylus 40 in the instrument as actually used in practice is a scribing point made to cut a graph line in the surface of a recording ribbon 41. This ribbon is preferably formed of a thin strip of metal, such for example as aluminum, so that a permanent record will be made. The ribbon is mounted on a spool 42 and is adapted to be wound on to a spool 43. Disposed between these spools is a marking block 44 which is carried by the case portion 29. This block carries brackets 45 by which the trunnions 46 of the spool 42 are rotatably supported. The block 44 provides a supporting surface 47 across which the ribbon 41 is drawn and by which it is backed during the scribing operation. Marginal clips 48 are disposed along opposite sides of the block 44 and beneath which the edges of the ribbon 41 passes. A flange 49 guides the ribbon and prevents lateral movement. Secured in fixed relation to the block 44 is a fixed arm 50 carrying a scribing point 51 by which a straight line will be scribed in the surface of the ribbon and will in effect provide a bench mark from which all graph measurements and calculations can be made.

The ribbon spool 43 is driven by a timing clock mechanism generally indicated at 52. This has a final drive shaft 53 carrying a gear 54 which is in mesh with a gear 55 on the spool 43. The exact construction of the clock mechanism is immaterial, it being desired to wind the clock through a member 56 and to set the clock mechanism in operation by a release member, such for example as the shifting member 57. Mounted above the clock is a recording thermometer generally indicated at 58 which comprises a Bourdon tube 59 operating a hand 60 through suitable mechanism. The hand carries a stylus 61 which will scribe a mark on a metal disc 62 removably held in place by a threaded plug 63.

In operation of the present invention the mechanism is assembled as shown in the drawings and the ribbon 41 and the temperature disc 62 are placed in position. The clock is wound and when the instrument is to be used the clock mechanism is released by the member 57. The device is lowered into the well within a perforated casing under normal circumstances, such as under production conditions a quantity of liquid is present within the well. As the instrument is lowered, the fluid, the pressure of which is to be measured, passes through the passageways 15 and 16 into the space 22' occurring below the diaphragm 23. This diaphragm separates the space 22 from the space 22' and acts as a closure to retain a liquid within the Bourdon tube 30, the passageways 18 and 21 and the space 22. This liquid may be any desired type of incompressible fluid. When the fluid is placed within this space the threaded plug 64 may be removed so that air may be vented from the instrument as displaced by the pressure liquid. In practice it has been found that the pressure exerted against the downwardly presented conical face of the diaphragm 23 will act to initially flex the apex area of the cone as indicated by dotted lines at 65 in Fig. 1. In fact due to the leverage elements interposed between the Bourdon tube 30 and the arm 35 the amount of deflection of the diaphragm indicated at 65 in Fig. 7 is approximately the maximum deflection of the diaphragm as represented by the range of the instrument. This flexure will be brought about in response to the pressure exerted by the fluid in the space 22' and will be transmitted to the fluid in the space 22 and upwardly through the communicating passageways leading to the Bourdon tube 30. The tube as it is distended by the pressure will act to swing the arm 35 and its stylus 40 in the direction of the arrow "a" as indicated in Fig. 5 of the drawings. It is understood that during this time the ribbon 41 is being unwound from the spool 42 and on to the spool 43 so that the stylus 40 in swinging will make a continuous graph line moving across the surface of the ribbon 41 in response to the pressure of the fluid within which the instrument is submerged. At the same time the stylus 40 is making a mark the fixed stylus 51 is scribing a straight mark along the edge of the ribbon. By this arrangement an accurate recording will be obtained even though the ribbon might not move in a path of travel exactly parallel to the longitudinal axis of the instrument. In tests of wells on production it will be evident that as the instrument is gradually submerged in the well the hydrostatic head above the instrument will increase so that the stylus 40 will progressively swing across the surface of the ribbon. Under such circumstances the instrument will not be subjected to any sudden or violent action. When, however, the instrument is used in connection with formation or casing shoe tests a violent action of great magnitude will occur. Under those conditions the instrument is lowered into the well below a packer, the well being filled with drilling fluid. As the instrument is lowered the pressure will gradually increase due to the hydrostatic head of the drilling fluid. When the packer is set the hydrostatic head of the drilling fluid will be imposed upon the packer and an entirely different pressure condition may prevail below the packer. After the packer is set a valve is opened from the production area to the drill stem which is at atmospheric pressure. Thus the pressure beneath the packer will be instantly relieved. This will require a sudden response of the pressure recording instrument. Later a valve of the tester is closed and the packer is lifted from its seat. This instantly imposed the entire hydrostatic head of drilling fluid upon the area within which the instrument has been placed, and will result in a violent shock to the instrument. In some instances a sudden pressure of as much as 4000 pounds is imposed upon the instrument or relieved therefrom. The instrument here shown has been especially designed and built to withstand these pressures and gradually respond thereto without damage to the instrument. These results are to a great degree accomplished by the use of the Bourdon tube since other devices, such for example as a Sylphon bellows, is liable to rupture or to be permanently distorted by high pressures. Furthermore the Bourdon tube is practically insensitive to temperature changes and in a well of ordinary working depth this change may range from 60° F. to 20° F. It is also of great advantage to use a tool having straight line calibrations, thus making its adjustment easy and the reading accurate. Such results have been found to be best obtainable by use of a Bourdon tube. These tubes will operate under a wide range of differential pressure as compared to most other fluid responsive means. In order that the operating conditions to which the present instrument is subjected may be appreciated reference is made to Fig. 8 of the drawings. Here it will be seen that the ribbon 41 is inscribed with two graph lines 70 and 71. It is to be understood that the appropriation, length and width of the ribbon has not been accurately shown in Fig. 8, since the ribbon is of considerable length. In fact one of the great advantages of the structure here disclosed is that the graph lines may be recorded on a long tape having a rapid tape travel, making it possible to readily distinguish variations in reading. In practice this travel is approximately five inches per hour. The graph line 70 is a straight line providing a bench mark for reading. This line is scribed on the ribbon by the fixed stylus 51. The graph line 71 is irregular and indicates the pressure variations. The reels are designed to stretch with relation to the ribbon so that compensation for change in diameter of the reels will be made without changing the time element. The portion $a$ of graph line 71 represents the increasing pressure of the hydrostatic head as the instrument is lowered into the well. A peak occurs at $b$ which represents the increased pressure created below the packer as the packer compresses the fluid entrapped below it as it is seated. The straight line $c$ indicates the drop of pressure at the time the valve of the tester is opened. The line $d$ indicates the native pressure occurring below the packer as the fluid is flowing into the drill string above the testing device. The line $e$ represents the pressure when the packer has been lifted to equalize the pressure above and below the packer, and the inclined line $f$ represents the gradually decreasing pressure as the instrument is withdrawn from the hole.

In preparing the instrument for operation it has been found desirable to permit a small volume of air to be sealed in the space 22 with the incompressible fluid. This brings about the desirable result that slight flexibility in the operation of the instrument will take place and will insure more accurate calibration.

It will thus be seen that the device here disclosed is simple and rugged in construction, and compact in design, so that it may be used conveniently in making production tests as well as formation and casing shoe tests, and that its recording apparatus is of such a character as to insure that an easily readable graph will be prepared accurately, indicating pressure conditions in a well, the instrument responding to violent variations in pressure without liability that the parts of the instrument will be broken or distorted.

While I have shown the preferred form of my invention, as now known to me, it will be understood that various changes might be made in the combination, construction, and arrangement of parts, by those skilled in the art, without departing from the spirit of the invention as claimed.

Having thus described my invention what I claim and desire to secure by Letters Patent is:

1. A device of the character described adapted to be submerged into fluid in a well bore to record the pressure thereof, comprising a tubular housing, upper and lower plug elements sealing the opposite ends of said housing, a body member connected to said lower plug element, a pressure recording means disposed in said housing above said body member, walls forming a fluid passage in said body member communicating with said pressure recording device, a diaphragm dividing said body member into two distinct non-communicating chambers, said diaphragm being conical and having its apex extending into one of said chambers, and means in the other of said chambers responsive to the movement of said diaphragm for actuating said recording means.

2. A device of the character described adapted to be submerged into fluid in a well bore to record the pressure thereof, comprising a tubular housing, plug elements for sealing off the upper and lower ends of said housing, a body member in said housing connected to said lower plug element, walls providing a fluid passageway in said body member, pressure recording means disposed in said housing above said body member, walls providing a passageway in said lower plug element through which the fluid in which the device is submerged will flow, a diaphragm disposed across said passageway and dividing said body member into upper and lower non-communicating chambers, said diaphragm being conical and having its apex extending into said lower chamber, and fluid means in said upper chamber responsive to the movement of said diaphragm for actuating said pressure recording means.

3. A device of the character described adapted to be submerged into fluid in a well bore to record the pressure thereof, comprising a tubular housing, plug elements for sealing off the upper and lower ends of said housing, a body member in said housing connected to said lower plug element, walls providing a fluid passageway in said body member, pressure recording means disposed in said housing above said body member, walls providing a passageway in said lower plug element through which the fluid in which the device is submerged will flow, a diaphragm disposed across said passageway and dividing said body member into upper and lower non-communicating chambers, said diaphragm being conical and having its apex extending into said lower chamber, said lower chamber being adapted for the reception of fluid from said bore, means in the other of said chambers responsive to the movement of said diaphragm for actuating said pressure recording means, the fluid in said lower chamber exerting pressure on the opposite side of said diaphragm.

4. A fluid pressure recording device adapted to be submerged in a fluid in a well bore to record the pressure thereof, comprising a body member, walls forming a fluid passageway in said body member, the lower end of which is accessible to the fluid in said well bore, a diaphragm dividing said body member into upper and lower non-communicating chambers, said diaphragm being conical and having its apex extending into said lower chamber and against which said well fluid acts, a fluid responsive means adjacent the upper end of said passageway, means in said upper chamber responsive to the movement of said diaphragm to transmit movement to said fluid responsive means, and recording means associated with said fluid responsive means to record the magnitude of fluid pressures imposed against said diaphragm.

CHRISTIAN W. SAVITZ.